United States Patent
Bürger

(10) Patent No.: US 8,497,219 B2
(45) Date of Patent: Jul. 30, 2013

(54) HIGHLY TEMPERATURE-RESISTANT AND CHEMICALLY RESISTANT GLASS AND GLASS FIBER HAVING IMPROVED UV LIGHT TRANSMISSION AND THE USE THEREOF

(76) Inventor: Gerhard Bürger, Hildesheim (DE)

( * ) Notice: Subject to any disclaimer, the term of this patent is extended or adjusted under 35 U.S.C. 154(b) by 0 days.

(21) Appl. No.: 13/058,282

(22) PCT Filed: Dec. 4, 2008

(86) PCT No.: PCT/EP2008/066812
§ 371 (c)(1), (2), (4) Date: Feb. 9, 2011

(87) PCT Pub. No.: WO2010/017846
PCT Pub. Date: Feb. 18, 2010

(65) Prior Publication Data
US 2011/0136955 A1    Jun. 9, 2011

(30) Foreign Application Priority Data
Aug. 14, 2008 (DE) .......................... 10 2008 037 955

(51) Int. Cl.
*C03C 13/06* (2006.01)
*C03C 3/087* (2006.01)

(52) U.S. Cl.
USPC ............... 501/36; 501/35; 501/38; 501/70; 501/71; 524/407; 428/480

(58) Field of Classification Search
USPC ...... 501/35, 36, 38, 70, 71; 524/407; 428/480
See application file for complete search history.

(56) References Cited

U.S. PATENT DOCUMENTS

| | | | |
|---|---|---|---|
| 4,026,715 A | 5/1977 | Erickson et al. | |
| 4,315,964 A * | 2/1982 | Ozaki et al. | 428/182 |
| 4,578,362 A * | 3/1986 | Schuster | 501/17 |
| 5,910,461 A * | 6/1999 | Gasca et al. | 501/35 |
| 6,458,436 B1 * | 10/2002 | Hansen et al. | 428/34.5 |
| 6,818,153 B2 * | 11/2004 | Burnell-Jones | 252/301.36 |
| 7,427,576 B2 | 9/2008 | Kravchenko et al. | |
| 2005/0130825 A1 * | 6/2005 | Kravchenko et al. | 501/36 |
| 2007/0112123 A1 * | 5/2007 | Sekine | 524/494 |

FOREIGN PATENT DOCUMENTS

| | | |
|---|---|---|
| EP | 0 832 046 B1 | 4/2000 |
| FR | 2 692 248 A1 | 12/1993 |
| GB | 1 391 384 A | 4/1975 |
| JP | 2000 247677 A | 9/2000 |
| JP | 2000 247683 A | 9/2000 |
| WO | WO 02/20419 A1 | 3/2002 |

OTHER PUBLICATIONS

International Preliminary Report on Patentability (IPEA/EP) for International Application No. PCT/EP2008/066812, report completed Dec. 8, 2010.

* cited by examiner

*Primary Examiner* — Karl Group
*Assistant Examiner* — Elizabeth A Bolden
(74) *Attorney, Agent, or Firm* — Duane Morris LLP; J. Rodman Steele, Jr.; Gregory M. Lefkowitz

(57) ABSTRACT

A highly temperature-resistant and chemically resistant glass and a glass fibre which have an improved UV light transmission, and the use thereof in UV-curable composites are disclosed. The glass/glass fibre according to the invention has a transition temperature >920° C., a light transmission of 80-92%, and consists of 58-62% $SiO_2$, 11.0-15.5% $Al_2O_3$, 20-25% CaO, 0.1-0.8% MgO, 0.04-1.2% $Na_2O$, 0.1-1.2 $K_2O$, 0.2-1.8% $TiO_2$, 0.05-0.5% $Fe_2O_3$ and 0.002-0.085 $Cr_2O_3$.

13 Claims, No Drawings

HIGHLY TEMPERATURE-RESISTANT AND CHEMICALLY RESISTANT GLASS AND GLASS FIBER HAVING IMPROVED UV LIGHT TRANSMISSION AND THE USE THEREOF

CROSS-REFERENCE TO RELATED APPLICATIONS

This application is a §371 national stage entry of International Application No. PCT/EP2008/066812, filed Dec. 4, 2008, which claims priority to German Patent Application No. DE 10 2008 037 955.7, filed Aug. 14, 2008, the entire contents of which are incorporated herein by reference.

FIELD OF THE INVENTION

The invention relates to a highly temperature-resistant and chemically resistant glass and a glass fibre which have an improved UV light transmission, and the use thereof in UV-curable composites.

BACKGROUND OF THE INVENTION

From U.S. Pat. No. 4,026,715, boron-free and fluoride-free glass compositions are known which contain 54.5-60% $SiO_2$, 9-14.5% $Al_2O_3$, 17-24% CaO, 2-4% $TiO_2$, 1.5-4% MgO and 1-6% RO (R=Zn, Sr, Ba) and not more than 3% $Na_2O+K_2O+Li_2O$, and are well suited for drawing fibres and have the properties of E glass. The chemical resistance of these fibres is therefore not satisfactory.

A known fibre according to EP-B-0832046, which has a good temperature stability and chemical resistance, contains 59-62% $SiO_2$, 12-15% $Al_2O_3$, 20-24% CaO, 1-4% MgO, 0.1-2% $Na_2O+K_2O$, 0-0.9% $TiO_2$ and 0-0.5% $Fe_2O_3$. The temperature stability, however, is not satisfactory for a number of uses.

WO03/050049 describes an endless glass fibre consisting of 56-62% $SiO_2$; 11-20% $Al_2O_3$; 20-24.5% CaO; 1.5-4% $TiO_2$; 0.2-1% MgO; 0.05-2% $Na_2O$; 0-2% $K_2O$; 0.11-0.3% $Fe_2O_3$, wherein shrinkage of the fibre at 800° C. is less than 20%. The transparency of this fibre, however, is not satisfactory for certain uses.

DETAILED DESCRIPTION

The object of the invention is to provide a highly temperature-resistant and chemically resistant glass and a corresponding glass fibre which have a good light transmission/refractive indexes.

According to the invention, the glass or glass fibre consists of (in % by weight relative to the total weight):

| | |
|---|---|
| $SiO_2$ | 58.0-62.0 |
| $Al_2O_3$ | 11.0-15.5 |
| CaO | 20.0-25.0 |
| MgO | 0.1-0.8 |
| $Na_2O$ | 0.04-1.2 |
| $K_2O$ | 0.1-1.2 |
| $TiO_2$ | 0.2-1.8 |
| $Fe_2O_3$ | 0.05-0.5 |
| $Cr_2O_3$ | 0.002-0.085 | and has a transition temperature of or above 920° C.

Particularly preferred glasses or glass fibres are those whose $SiO_2$ content is in the range of 59.8 to 61.3%.

The $Al_2O_3$ content can preferably range from 13.0 to 15.0%, in particular from 13.5 to 14.7%.

The CaO content can preferably be in the range from 22.0 to 25.0%, in particular from 22.6 to 24.4%.

The $TiO_2$ content preferably ranges from 0.2 to 1.2%, in particular from 0.2 to 0.95%.

A preferred range for the transition temperature is 920-970° C., in particular 925-960° C.

The light transmission of the glass according to the invention ranges from 80 to 92%, in particular from 85 to 91%.

The measurement of the light transmission is carried out according to DIN 67507 using a spectrophotometer and an integrating sphere; the measurement error is ±0.5%.

The glass according to the invention is produced according to known methods, and the glass fibre according to the invention can be produced by means of any conventional method for producing endless glass fibres. Endless glass fibres can be produced by means of two-stage or single-stage methods. From the raw batch, glass pellets or glass globules are produced, which are melted again in the second stage, and the melt obtained is drawn into fibres. The raw batch can also be processed directly into a melt that is used to draw fibres. The fibres are formed by drawing fibres with the aid of a winder and simultaneous solidification of the melt in the glass filaments or glass fibres.

A preferred method according to the invention consists in that the raw glass batch is melted in an oxidizing atmosphere while the difference between the limiting liquidus temperature of the glass melt and the fibre forming temperature is adjusted to 75° C. or more.

Oxidizing atmosphere means that the ratio of oxygen to exhaust gas is in the range from 0.8 to 1.6. The ratio of FeO to $Fe_2O_3$ ranges between 0.5 and 1.2.

The fibre forming temperature is a temperature ranging between 1270 and 1420° C. This means that a viscosity of the melt of $10^3$ poises is reached at 1270° C. and higher, and the limiting liquidus temperature is above 1190° C. Delta T for the glass melt is not less than 70° C., preferably more than 90° C. and in particular more than 120° C.

The invention also relates to the use of a glass or a glass fibre in the form of a continuous glass fibre in a composite consisting of a glass fibre and a UV-curable polyester resin or vinyl ester resin, wherein the glass/glass fibre has a light transmission of 80 to 92%.

This can for example be done by impregnating a glass fibre mat or a glass fibre hose with a UV-curable polyester resin or vinyl ester resin (laminate), giving an appropriate shape to said mat or hose, and arranging a stationary or mobile UV radiation source near the composite which will then be cured by the UV radiation within a settable time. The wavelength of the UV radiation source is in the range of 250-420 nm.

Preferred resins are e.g. high-quality, unsaturated polyester resin of type 1140 or special resin vinyl ester of type 1310.

Curing of the so called UP liners solely with UV light is usually allowed for liners having small wall thicknesses only. In case of greater wall thicknesses (s>7 mm), UV curing may only be used in combination with supplementary peroxidic curing.

As problems may arise during passage of the UV light waves (in the nanometre range) through the glass fibre layers from a certain thickness (approx. 8 to 10 mm) due to deflection of the rays, thus preventing proper curing all through the laminate, peroxides known from heat curing were usually added to the resin curing agent mixture. Said peroxides react due to the intrinsic temperature during the reaction initiated by the UV rays, thus continuing the curing process in the outer peripheral zones of the liner. While this reduces the storage stability of the UV light-cured liner (normally approx. 6 months), it ensures proper curing all through the laminate.

A particularly preferred embodiment of the invention is a composite in which the resin and the glass fibre have approximately the same refractive indexes.

As the thickness of the glass fibre and the resin, which form the composite to be cured, is of importance for UV ray curing, it should in general be in the range from 2 to 7 mm, as is well known. If the glass fibre according to the invention is used, wall thicknesses of the composite of up to 15 mm can be achieved which can be cured without problem. Optionally, this may also be done without peroxides; this is a particular advantage of the invention as the storage stability will increase.

Another requirement of the glass or glass fibre according to the invention is chemical resistance. In general, chemical resistance is 5.4 and 7.7% by weight (material consumption at 10% HCl for 24 h and 186 h). In the present invention, it is 4.8 and 6.8% by weight, that is to say much better.

The glass fibres according to the invention can also be used as a filling material in silencers for exhaust gases, either directly or as a roving or as a hose or a mat. They are clearly superior to known fibres due to their high thermal stability and good chemical resistance.

Another embodiment of the use consists in that the glass fibre roving is used in a silencer in combination with steel wool, wherein a central perforated pipe through which the exhaust gases pass is wrapped in the steel wool, the endless glass fibre according to the invention is arranged in a random orientation around this inner shell, and the outer shell is formed by a container having an exhaust outlet. The temperature resistance and shrinkage behaviour of the glass fibre are improved even further in this way. The temperature resistance of the glass according to the invention is determined with the aid of the transition temperature (DIN ISO 7884-8) and is in the range of 760-780°.

The invention will now be explained in more detail by means of examples.

EXAMPLE 1

In a laboratory glass melting facility, glass is produced whose composition is analyzed to be (in % by weight):
$SiO_2$: 60.7%, $Al_2O_3$: 14.0%, CaO: 23.4%, MgO: 0.4%, $Na_2O+K_2O$: 0.75%, $TiO_2$: 0.4%, $Fe_2O_3$: 0.3%, $Cr_2O_3$: 0.015%.

The temperature at a viscosity of $10^3$ poises is 1291° C., the limiting liquidus temperature is 1200° C., and the difference between the limiting liquidus temperature and the fibre forming temperature (delta T) is 91° C.

From this glass, fibres are drawn and combined into a roving by means of a laboratory facility in which a crucible comprising orifice nozzles and which is made of a platinum rhodium alloy is installed. The glass was heated above the deformation temperature of 1290° C., and the glass fibres were drawn after a holding time of 30 min at each temperature increment of 10° C. The fibre drawing interval ranges from 1290 to 1360° C. This means that the aforesaid composition is able to ensure stable process cycles for drawing fibres over a span of 70° C.

The continuous glass fibres drawn have a transition temperature of 927° C. and a light transmission of 89.9%.

Their chemical resistance at 10% HCl is 4.82 and 6.4% by weight (material consumption) for 24 h and 186 h respectively. They are temperature-resistant up to approx. 760° C.

EXAMPLE 2

The fibres of example 1 and a light-curing polyester resin of type 1140 are processed into a laminate whose plate thickness is 8 mm. The visually clear laminate is subjected to radiation from a UV source and cured within 5 minutes.

EXAMPLE 3

A glass is produced according to example 1 and with the following composition: 60.2 $SiO_2$, 13.83 $Al_2O_3$, 23.5 CaO; 0.31 MgO, 0.18 $Na_2O$, 0.54 $K_2O$, 1.2 $TiO_2$, 0.25 $Fe_2O_3$, 0.03 $Ca_2O_3$.

The limiting liquidus temperature is 1183° C., and delta T is 100° C. The fibre drawing interval ranges from 1270 to 1350° C. The continuous glass fibres drawn have a transition temperature of 922° C.

EXAMPLE 4

The fibres of example 3 are processed as in example 2 so as to obtain a plate of 9.5 mm, which is cured by means of UV radiation within 7 minutes.

The invention claimed is:

1. A highly temperature-resistant and chemically resistant glass having improved light transmission consisting of (in % by weight and relative to the total weight)

| | |
|---|---|
| $SiO_2$ | 58.0-62.0 |
| $Al_2O_3$ | 11.0-15.0 |
| CaO | 22.0-25.0 |
| MgO | 0.1-0.8 |
| $Na_2O$ | 0.04-1.2 |
| $K_2O$ | 0.1-1.2 |
| $TiO_2$ | 0.2-1.8 |
| $Fe_2O_3$ | 0.05-0.5 |
| $Cr_2O_3$ | 0.002-0.085 | and having a transition temperature of or above 920° C.

2. A glass according to claim 1, wherein the $SiO_2$ content is in the range of 59.8 to 61.3% by weight.

3. A glass according to claim 1, wherein the $Al_2O_3$ content is in the range from 13.0 to 15.0% by weight.

4. A glass according to claim 1, wherein the $Al_2O_3$ content is in the range from 13.5 to 14.7% by weight.

5. A glass according to claim 1, wherein the CaO content is in the range from 22.0 to 25.0% by weight.

6. A glass according to claim 1, wherein the $TiO_2$ content is in the range from 0.2 to 1.2% by weight.

7. A glass according to claim 1, wherein the transition temperature is in the range of 925-970° C.

8. A glass according to claim 1, wherein the glass or the fibre has a light transmission ranging from 80 to 92.

9. A glass according to claim 1, wherein the $TiO_2$ content is in the range from 0.2 to 0.95% by weight.

10. A glass according to claim 1, wherein the glass has a light transmission ranging from 85 to 91%.

11. A glass according to claim 1, wherein the glass is in the form of a glass fiber.

12. A composite comprising:
a glass fiber according to claim 11; and
a UV curable polyester resin, wherein the polyester resin has a light transmission ranging from 89 to 94%.

13. The composite according to claim 12, wherein the glass fiber has a light transmission ranging from 80 to 92%.

* * * * *